May 16, 1944.  W. KIERSTED, JR  2,348,822
FILTRATION
Filed June 28, 1941  2 Sheets-Sheet 1

WYNKOOP KIERSTED JR.
INVENTOR
BY
ATTORNEY

Patented May 16, 1944

2,348,822

UNITED STATES PATENT OFFICE 2,348,822

FILTRATION

Wynkoop Kiersted, Jr., Scarsdale, N. Y., assignor, by mesne assignments, to The Texas Company, New York, N. Y., a corporation of Delaware Application June 28, 1941, Serial No. 400,208

3 Claims. (Cl. 210—199)

This invention relates to filtration and particularly to the separation of solids from a mixture of solids and liquid by continuous filtration.

The invention broadly contemplates a continuous filter operation, such as conducted with a continuous rotary filter apparatus, wherein the interior of the filter element bearing the filter cake is purged of mother liquor after the filter cake has emerged from the mixture undergoing filtration and has been subjected to a primary application of wash liquid, but prior to subjecting the filter cake to further application of wash liquid in situ.

A continuous rotary filter useful in practicing the invention may comprise a hollow, rotating cylinder or comprise hollow rotating leaves with means for either creating vacuum within the interior of the filter element or for exerting positive pressure upon the exterior thereof.

A rotary drum filter comprises a cylindrical filtering surface. The filtering surface in turn comprises a plurality of separate, segmental compartments or sections. Each compartment or section is connected by drain pipes to a conventional filter valve.

In operation, the rotating cylinder is partially submerged in the filtering mixture, the submergence being about 40 to 60% of the filtering surface. Solids are deposited on the submerged exterior portion of the filter surface to form a filter cake while liquid flows through the cake and through the filter surface into the interior of the submerged filter compartment from which it is discharged through the drain pipes into the filter valve and from there conducted to a filtrate receiver as primary filtrate.

As the cylinder rotates the filter surface with cake deposited upon it emerges from the filtering mixture. Upon emerging from the filtering mixture, filtration continues coupled with washing of the filter cake so that mother liquor contained in the filter cake is displaced by the wash liquid and is drawn into the interior of the filter compartment, from which it is discharged through the drain pipes and filter valve into suitable filtrate receivers. Washing of the exposed filter cake is effected with a wash liquid or solvent which is usually applied to the exterior of the exposed cake in the form of a spray.

After passage through the washing zone, the filter cake is subjected to drying by the passage through it of gas. Thereafter the cake is removed from the filter surface usually by applying a slight reverse pressure to the interior of the filter element causing distension of the fabric and consequent loosening of the cake. Complete removal of the cake is effected by a suitable deflector blade located adjacent to the exterior surface of the filter fabric.

In large scale filter installations where the filter drum may have a diameter of about 8 to 10 feet the interior of each segmental section or compartment of the filter including the drain pipes connecting each section with the filter valve will comprise a substantial volume, for example, about 1 cubic foot. Consequently, as each section emerges from the filtering mixture the interior will be substantially filled with mother liquor which continues to discharge from the drain pipes as the filter section rotates toward the zenith in its path of travel.

As already pointed out it is customary to apply a spray of wash liquid or solvent over the filter cake after it has emerged from the filtering mixture. In the usual operation, wash liquid is applied to the exterior of the filter cake immediately as it emerges from the filtering mixture for the purpose of effecting a "piston" displacement of mother liquor from the cake into the interior of the filter element. Upon continued rotation of the filter additional wash liquid is applied to the exterior of the filter cake for the purpose of removing remaining mother liquor retained in the cake. Heretofore, the filter valve has been arranged so that filtrate produced during the primary application of wash liquid to the exterior of the filter cake is permitted to flow into the mother liquor filtrate receiver, and filtrate produced during the secondary or continued application of wash liquid is diverted through a separate discharge conduit to a separate receiver as secondary or wash filtrate.

However, this secondary filtrate usually contains a large amount of mother liquor, largely due to the fact that the mother liquor and primary wash liquid does not drain rapidly enough from the interior of the filter element and the drain pipes communicating with the filter valve.

One object of the present invention is to provide for positive displacement of substantially all of the mother liquor from the emergent filter compartment immediately after the primary application of the wash solvent or wash liquid. This is accomplished by providing additional blocks within the circular channel of the conventional filter valve as will be explained by reference to the accompanying drawings.

Figure 1:
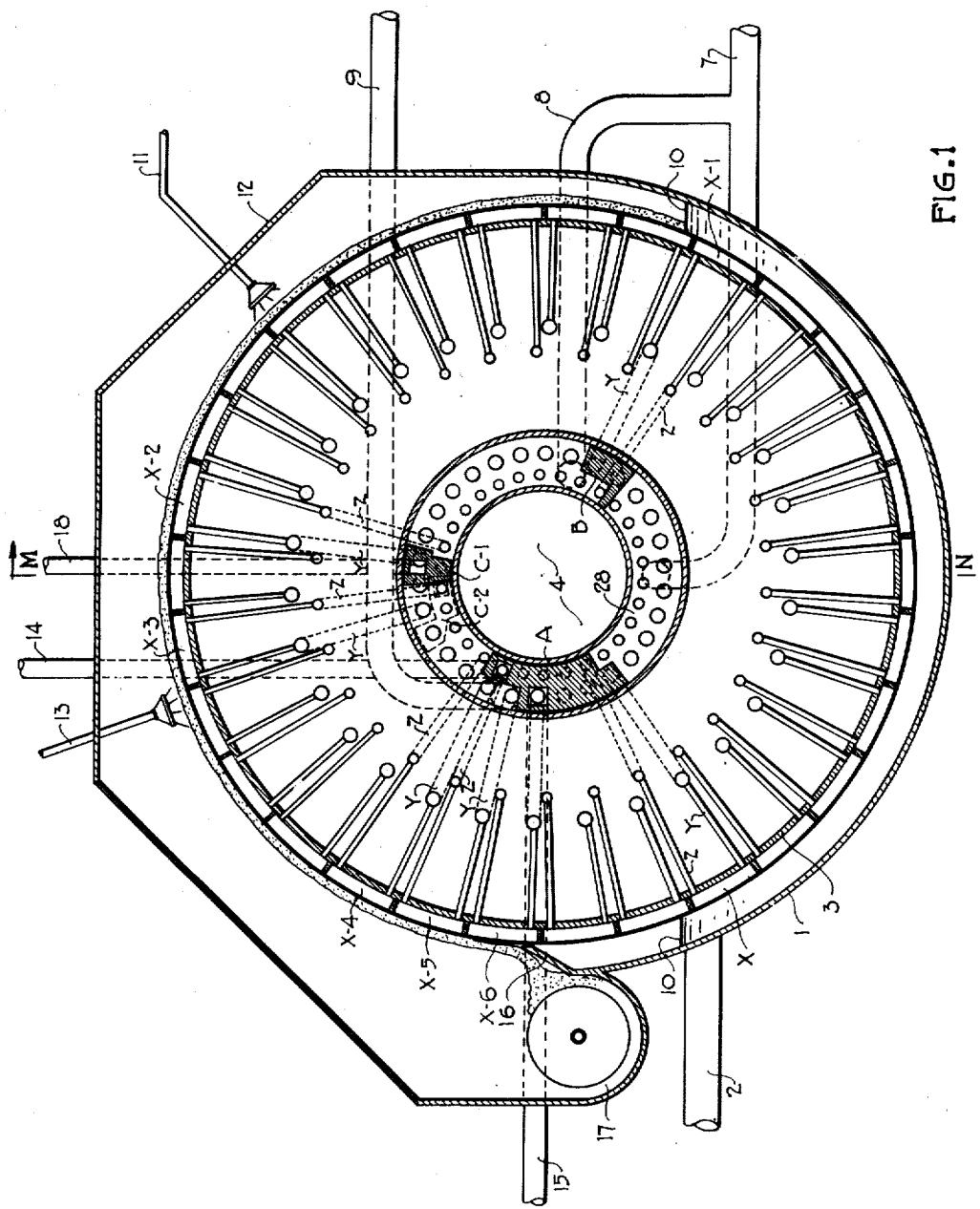
Figure 1 is a diagrammatic sectional view of a rotary drum filter taken along a plane normal to the axis of the drum.

As shown in the figures the filter comprises a bowl 1 into which the mixture to be filtered is introduced through a pipe 2.

Within the bowl is a horizontal drum 3 rotatably supported by a trunnion 4. The trunnion terminates in the customary filter valve illustrated in the figures.

The cylindrical surface of the drum 3 is surrounded by a filter fabric in the conventional manner. The cylindrical portion of the drum is divided into a plurality of separate segmental sections X about 30 in number. Each of these segmental sections is connected by leading and trailing drain pipes Y and Z respectively to the filter valve on the trunnion 4.

In operation of the filter, filtrate including mother liquor, wash solvent and mixture of mother liquor and wash solvent is drawn through the filter surface into each segmental section and from there through the drain pipes Y and Z to the filter valve from which it is discharged through pipes 7, 8 and 9 as will be described in more detail.

The solids are deposited in the form of a filter cake on the outer surface of the filter fabric while the main stream of mother liquor filtrate is discharged through pipe 7. As the drum rotates the filter cake emerges from the filtering mixture, the surface of which may be maintained at a point corresponding to that shown by the numeral 10.

Upon emergence, the filter cake is subjected to washing by a spray 11 of primary wash liquid introduced through a spray extending through the filter shell 12. This wash liquid is forced through the cake to displace the mother liquor contained in the cake and thence into the interior of the filter section to form filtrate relatively rich in mother liquor which is discharged through pipe 8, and is usually merged with the main stream of filtrate discharging through pipe 7.

After the filter cake passes zenith in its path of travel it is subjected to a secondary application of wash liquid through spray 13, the filtrate produced in this zone being discharged through pipe 9.

Upon further rotation, the filter cake is subjected to drying by the passage through it of flue gas or other inert gas, such gas being supplied to the interior of the filter shell by a pipe not shown. Following this the filter cake is discharged. This is accomplished by introducing a reverse pressure to the interior of the filter surface by means of gas introduced through a blowback pipe 15. In this way the filter fabric is distended and the cake removed therefrom by means of a knife or scraper 16. The dislodged cake is discharged into a trough 17 of a conveyor.

Referring to Figure 1 and considering the operation of a vacuum filter, it will be seen that as soon as any section X has become completely submerged, drain pipes Y and Z connecting the leading and trailing edges of the section X begin to pass from under block A in the filter valve thus exposing the section X to reduced pressure, which is maintained therein for the purpose of inducing filtration. The vacuum remains unchanged while the section travels to a position just ahead of $X^1$.

At that point the ports corresponding to drain pipes Y and Z pass under block B.

The space between blocks A and C (in the direction of drum rotation) is divided by block B so that a different pressure differential may be maintained through the cake in the respective zones. For example, it may be advantageous to maintain a lower pressure differential through the cake in the zone between blocks A and B than in the zone between blocks B and C, in order to prevent building too thick a cake during submergence of the segment. In other words, less vacuum is exerted within the segment during rotation through the zone between blocks A and B. A greater vacuum in the zone between blocks B and C prevents the cake slipping from the drum surface after emergence from the liquid level.

Block B has a width on the inner side equal to slightly more than the diameter of the port corresponding to pipe Z so that immediately after the vacuum between blocks A and B has been cut off from $X^1$ the section is opened to vacuum between blocks B and C through pipe Z.

In this way the drainage of mother liquor from the section into the zone between blocks B and C is conducted through openings on the trailing side of the section by way of pipe Z. As the section emerges from the liquid level the port corresponding to pipe Y connected with the leading edge of the section emerges into the vacuum zone between blocks B and C.

The drainage of mother liquor continues until block $C^1$ (or alternately block $C^2$) is reached.

Thus, assuming that the block is in the position of block $C^1$ located at a point just before zenith, the port corresponding to pipe Y passes under block $C^1$ and opens to a port within this block through which is supplied flue gas under about 5 pounds gauge pressure from a pipe 18. The flue gas then flows through the pipe Y to section $X^2$, across the interior of the section and out through the trailing drain pipe Z.

The port openings and pipe sizes are advantageously proportioned to afford several complete changes of flue gas through the section and piping while the port of pipe Y is opened to the port in block $C^1$ in order to purge out all liquid. Block $C^1$ may have an undercut channel or throttling groove, not shown, so that flue gas may be admitted to pipe Y at a gradually increasing rate before the port of pipe Y actually engages the opening in block $C^1$.

Where the block is in the position of $C^2$ located just after the section passes zenith the purge gas is admitted through pipe Z instead of pipe Y and the liquid is purged out through pipe Y since pipe Y is on the lower side of the section after passing the zenith. After passing block $C^1$, or alternately $C^2$, the section travels to a position such as $X^3$. At this point the port corresponding to pipe Z passes under block A and at position $X^3$, is opened to a port in the block A through which is supplied flue gas under pressure as in the case of block $C^1$. The flue gas flows through the pipe Z and purges liquid out through pipe Y to the section between blocks C and A. This latter purging operation is for the purpose of preventing loss of wash liquid from the filter section $X^3$ by blowback during cake discharge, at which time the port corresponding to pipe Y is open through block A to a supply of flue gas under pressure.

Thus, by providing the blocks $C^1$ or $C^2$ in the filter valve and introducing a purge gas through the ports therein as above described, the mother liquor is substantially entirely displaced and drained from the emergent filter sections prior to the secondary application of the wash liquid, and the mother liquor is substantially entirely removed as primary filtrate through the pipes 7 and 8. The secondary wash liquid is substantially entirely discharged therefrom as secondary or wash filtrate through the pipe 9 and is relatively lean in mother liquor.

The advantage of this arrangement is demonstrated in the case of filtering decolorizing clay from a mixture of clay and oil or from a mixture of clay and color removal solvent such as described in my pending application, Serial No. 312,667, filed January 6, 1940, for Method of and apparatus for recovering adsorbent materials. Thus, operating in the conventional manner without the purging step, 1003 gallons per hour of filtrate are drawn off from the space between blocks C and A (in the direction of drum rotation) and 2063 gallons are drawn off as combined liquid from the spaces between blocks A and C. On the other hand, when operating with the purging step the respective volumes of liquid drawn off are 364 and 2782 gallons per hour. In other words, with the purging step some 639 gallons of filtrate, consisting mainly of mother liquor are diverted into primary filtrate that would otherwise be discharged as secondary filtrate.

Thus, by means of the purging step of this invention washing of the filter cake to displace and remove retained mother liquor is rendered more effective. The secondary filtrate obtained following the purging step contains a relatively small amount of mother liquor and, therefore, can be recycled in a conventional filtering operation as a diluent for the initial feed mixture to the filter. Where the purging step is omitted, the secondary filtrate is richer in oil and instead of recycling it it is necessary to subject it to a fractional distillation in order to separate the wash liquid from the mother liquor.

However, where the purging step is practised, it is unnecessary to subject the secondary filtrate to the recovery operation thereby materially reducing the cost of the filtering operation. In fact, the resulting reduction in cost is sufficient to actually permit the application of a larger volume of wash liquid in the secondary washing step and thereby permit subjecting the filter cake to additional washing.

Figure 2:
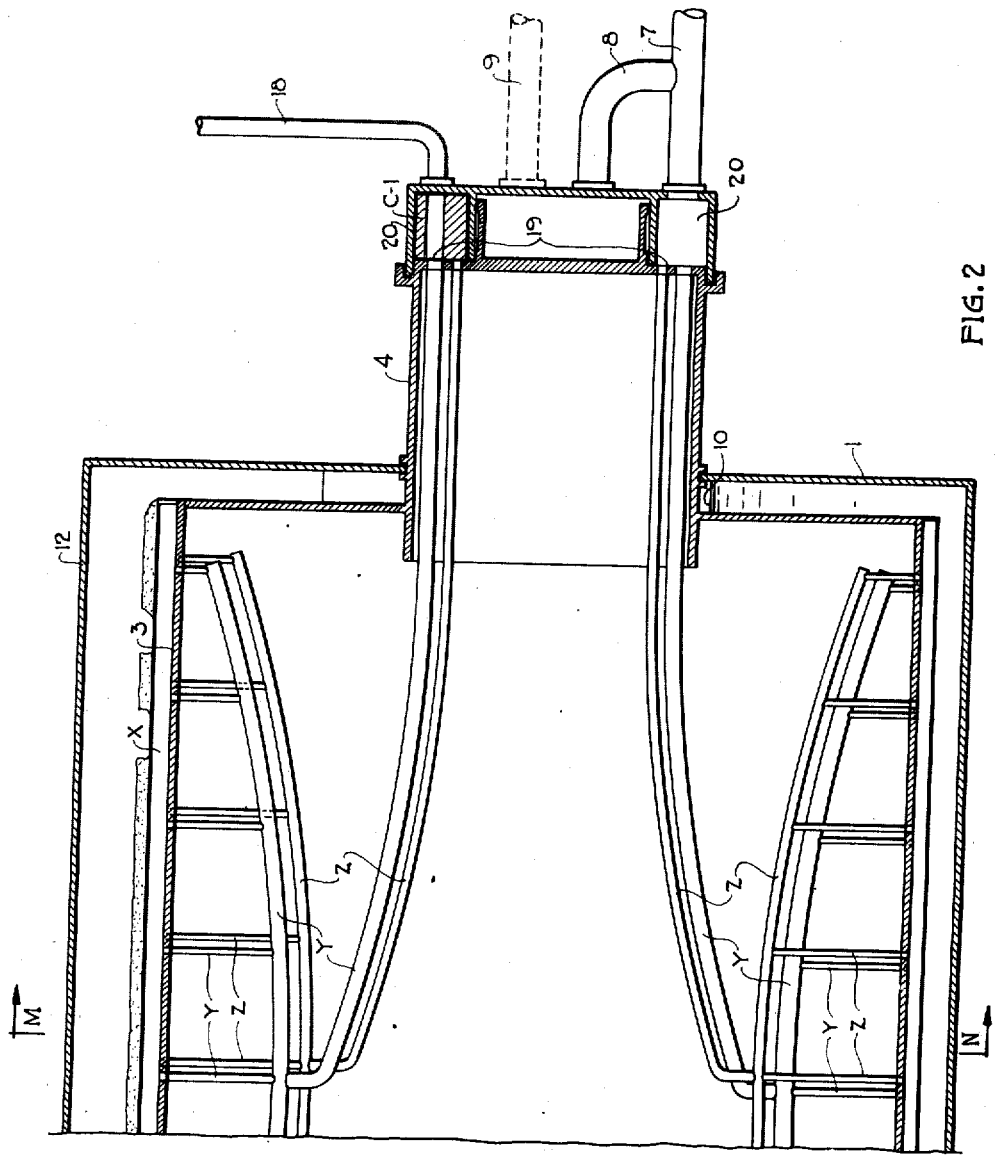
Figure 2 is a sectional view taken along the axis of the filter drum showing the interior of a portion of the filter drum and the filter valve.

Numeral 19 in Figure 2 designates the rotating bearing surface of the filter valve adjacent the end of the trunnion 4 and in which surface terminate the drain pipes X and Y, affording communication with the aforementioned segmental sections X of the filter surface. Numeral 20 designates a channel in the filter valve into which the blocks A, B and C¹ or C² are rigidly attached to the filter valve. These blocks are removable and are so formed as to provide a snug fit and thus completely block the channel 20 at the point of their location.

As already described the trunnion 4 rotates with the filter drum, while the filter valve remains stationary. Therefore, since the blocks A, B and C are rigidly attached to the filter valve they slide over the moving surface 19 of the trunnion 4. The surface 19 is advantageously of brass while the blocks are formed of steel and in this way a slidable, substantially leakproof joint is provided between the trunnion 4 and the blocks of the filter valve.

It is contemplated that the position of the filter blocks relative to each other and to the filter valve channel may be adjusted depending upon the particular type of filtering operation being practised.

While application of the invention to the filtration of decolorizing clay from a mixture of such clay and liquid has been described, nevertheless it is contemplated the invention is applicable to various filtering operations including, for example, a dewaxing operation in which solidified wax is filtered from a chilled mixture of wax bearing oil and diluent or solvent liquid.

Obviously many modifications and variations of the invention as hereinbefore set forth may be made without departing from the spirit and scope thereof, and therefore only such limitations should be imposed as are indicated in the appended claims.

I claim:

1. In the continuous filtration of solids from a mixture of solids and mother liquor by means of a continuous rotary drum filter, the filter drum comprising a plurality of hollow segmental filter elements whose leading and trailing portions are in fluid communication through separate drain pipes with a filter valve, the steps comprising rotating the drum so that each filter element submerges within and then emerges from the mixture, forming a filter cake of solids upon the exterior of each element and forcing mother liquor through the cake into the interior of each element during rotation through the mixture, discharging mother liquor from the interior of an element through the filter valve as filtrate, subjecting each cake-bearing element during continued rotation after emerging from the mixture and before reaching the zenith in its path of travel to a primary application of wash liquid to displace mother liquor from the cake into the interior of the element, discharging displaced liquor through the filter valve, injecting gas through a leading drain pipe to the interior of each element as it approaches said zenith, discharging the so injected gas together with liquid from the interior of said element through a trailing drain pipe, discontinuing the injection of said gas through said leading drain pipe of each cake-bearing element as it moves away from said zenith, admitting gas under pressure through said trailing drain pipe of each element during said discontinuance, discharging the so admitted gas together with remaining liquid from the interior of the element through said leading drain pipe, thereafter subjecting each washed cake-bearing element to a secondary application of wash liquid which is forced through the filter cake into the interior of the element, and separately discharging said liquid from the interior of the filter element through the filter valve.

2. In the continuous filtration of solids from a mixture of solids and mother liquor by means of a continuous rotary drum filter, the filter drum comprising a plurality of hollow segmental filter elements whose leading and trailing portions are in fluid communication through separate drain pipes with a filter valve, the steps comprising rotating the drum so that each filter element submerges within and then emerges from the mixture, forming a filter cake of solids upon the exterior of each element and forcing mother liquor through the cake into the interior of each element during rotation through the mixture, discharging mother liquor from the interior of an element through the filter valve as filtrate, subjecting each cake-bearing element during continued rotation after emerging from the mixture and before reaching the zenith in its path of travel to a primary application of wash liquid to displace mother liquor from the cake into the interior of the element, discharging displaced liquor through the filter valve, injecting gas through a leading drain pipe to the interior of each element as it approaches said zenith, discharging the so injected gas together with liquid from the interior of said element through a trailing drain pipe, discontinuing the injection of said gas through said leading drain pipe of each cake-bearing element as it moves away from said zenith, admitting gas under pressure through said trailing drain pipe of each element during said discontinuance, discharging the so admitted gas together with remaining liquid from the interior of the element through said leading drain pipe, thereafter subjecting each washed cake-bearing element to a secondary application of wash liquid which is forced through the filter cake into the interior of the element, separately discharging said liquid from the interior of the filter element through the filter valve, rotating each cake-bearing element after said secondary washing through a drying zone, forcing gas through said cake during passage through the drying zone, then rotating each dried cake-bearing element through a zone of cake discharge, and removing the cake therefrom during passage through said cake discharge zone.

3. In the continuous filtration of solids from a mixture of solids and mother liquor by means of a continuous rotary drum filter, the filter drum comprising a plurality of hollow segmental filter elements whose leading and trailing portions are in fluid communication through separate drain pipes with a filter valve, the steps comprising rotating the drum so that each filter element submerges within and then emerges from the mixture, forming a filter cake of solids upon the exterior of each element and forcing mother liquor through the cake into the interior of each element during rotation through the mixture, discharging mother liquor from the interior of an element through the filter valve as filtrate, subjecting each cake-bearing element during continued rotation after emerging from the mixture and before reaching the zenith in its path of travel to an application of wash liquid to displace mother liquor from the cake into the interior of the element, discharging displaced liquor through the filter valve, injecting gas through a leading drain pipe to the interior of each element as it approaches said zenith, discharging the so injected gas together with liquid from the interior of said element through a trailing drain pipe, reversing the direction of flow of fluids through each filter element and its leading and trailing drain pipes as it moves away from said zenith so that the gas is admitted under pressure through a trailing drain pipe and fluids comprising gas and liquid are discharged through a leading drain pipe, subsequently rotating the washed cake-bearing element through a drying zone during which drying gas is forced through the cake and continuing the rotation of the dried cake-bearing element through the zone of cake discharge during which the filter cake is discharged from the element.

WYNKOOP KIERSTED, Jr.